July 4, 1961 B. J. NIGRELLI ET AL 2,990,952
PACKAGE INSPECTION AND SORTING MECHANISM
Filed June 24, 1957 4 Sheets-Sheet 1
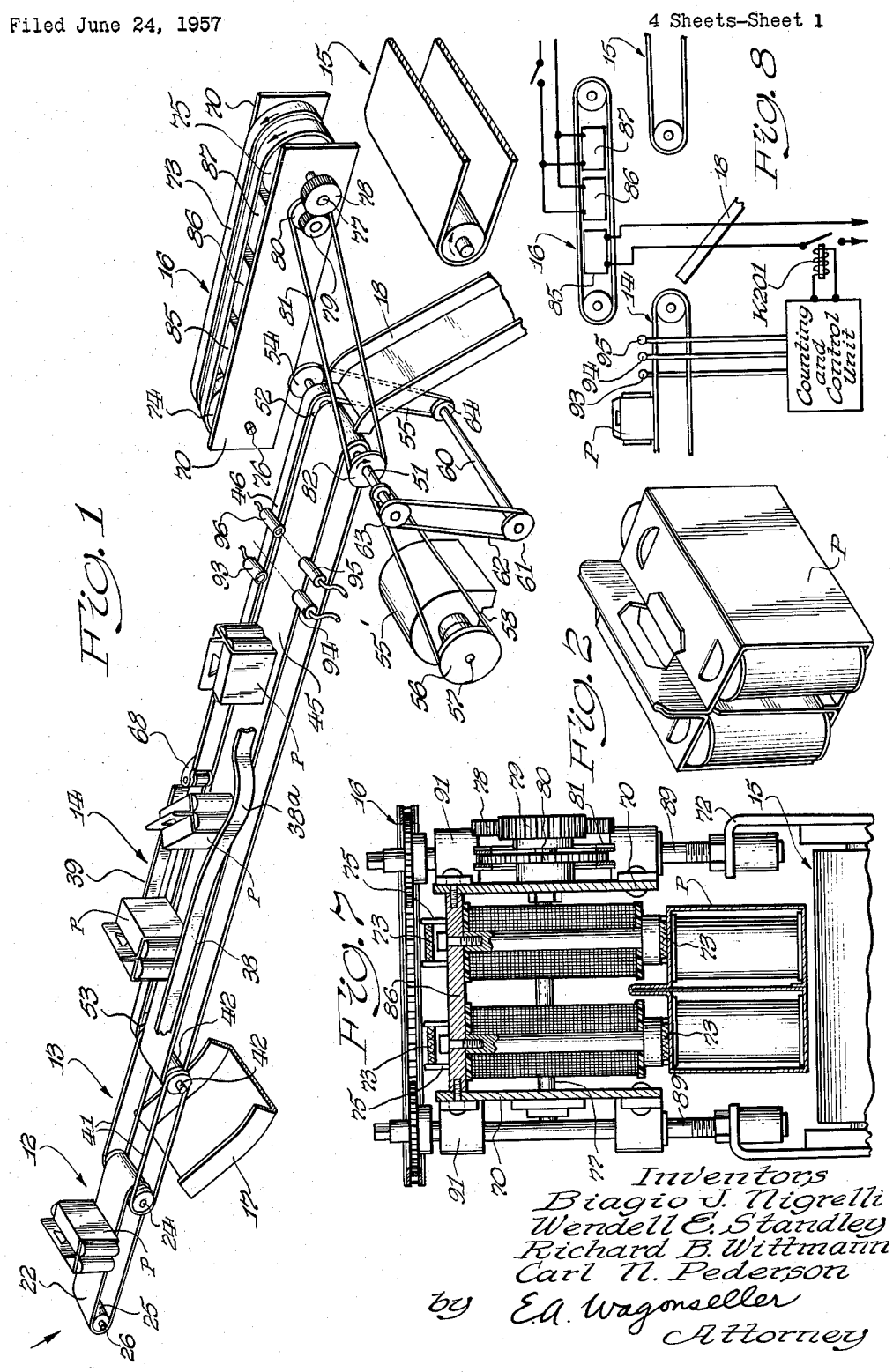
Inventors
Biagio J. Nigrelli
Wendell E. Standley
Richard B. Wittmann
Carl N. Pederson
by E.A. Wagonseller
Attorney

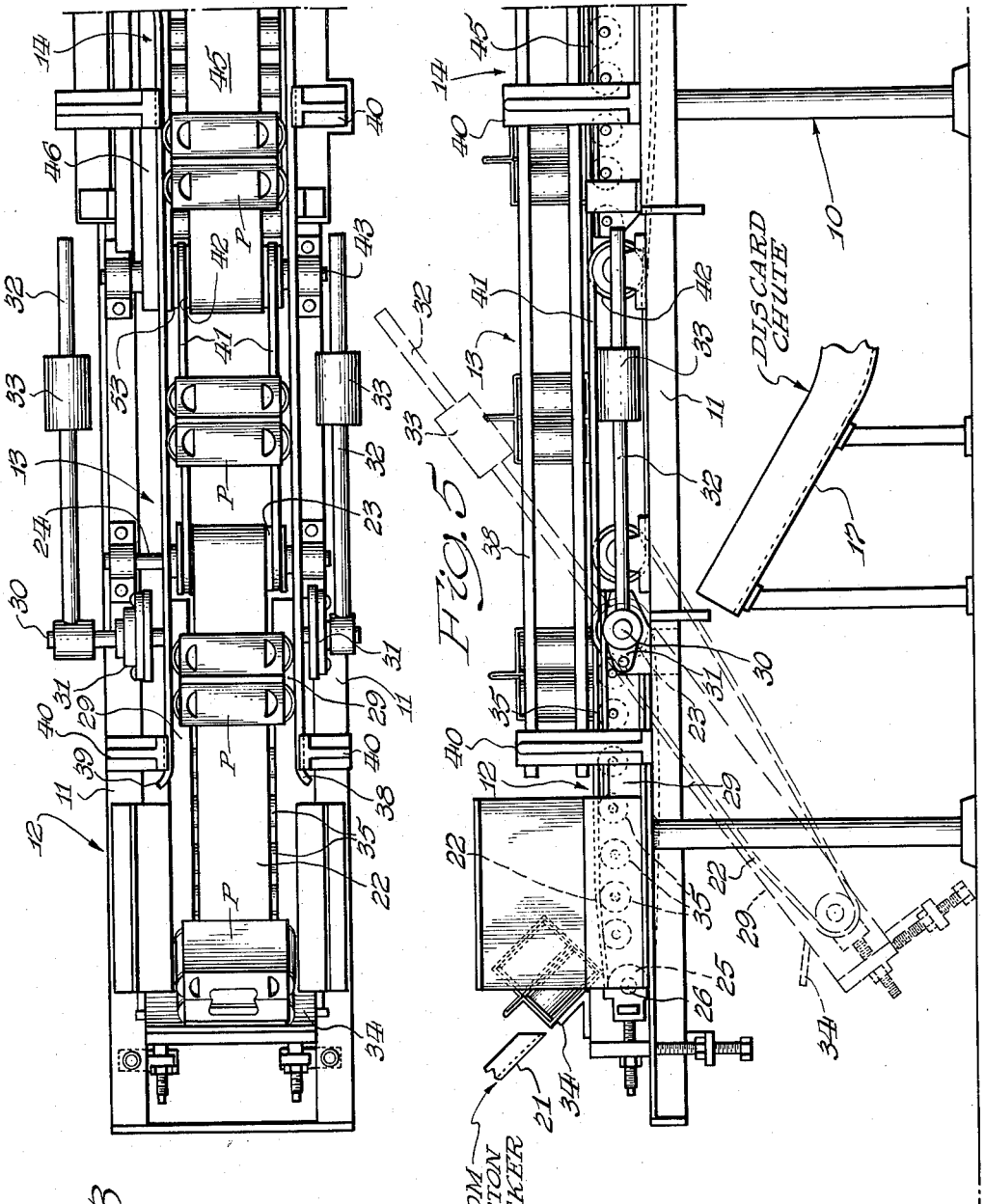

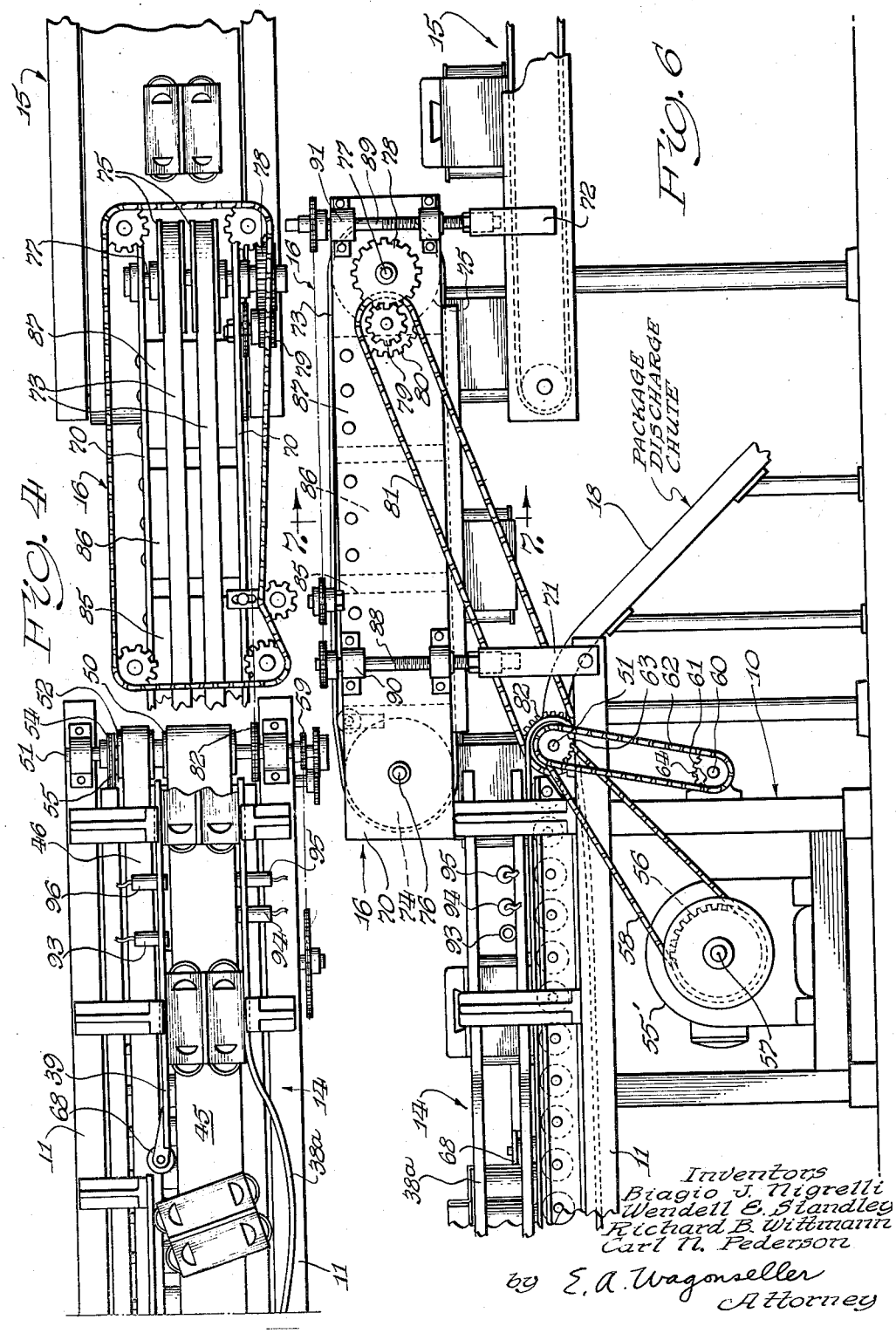

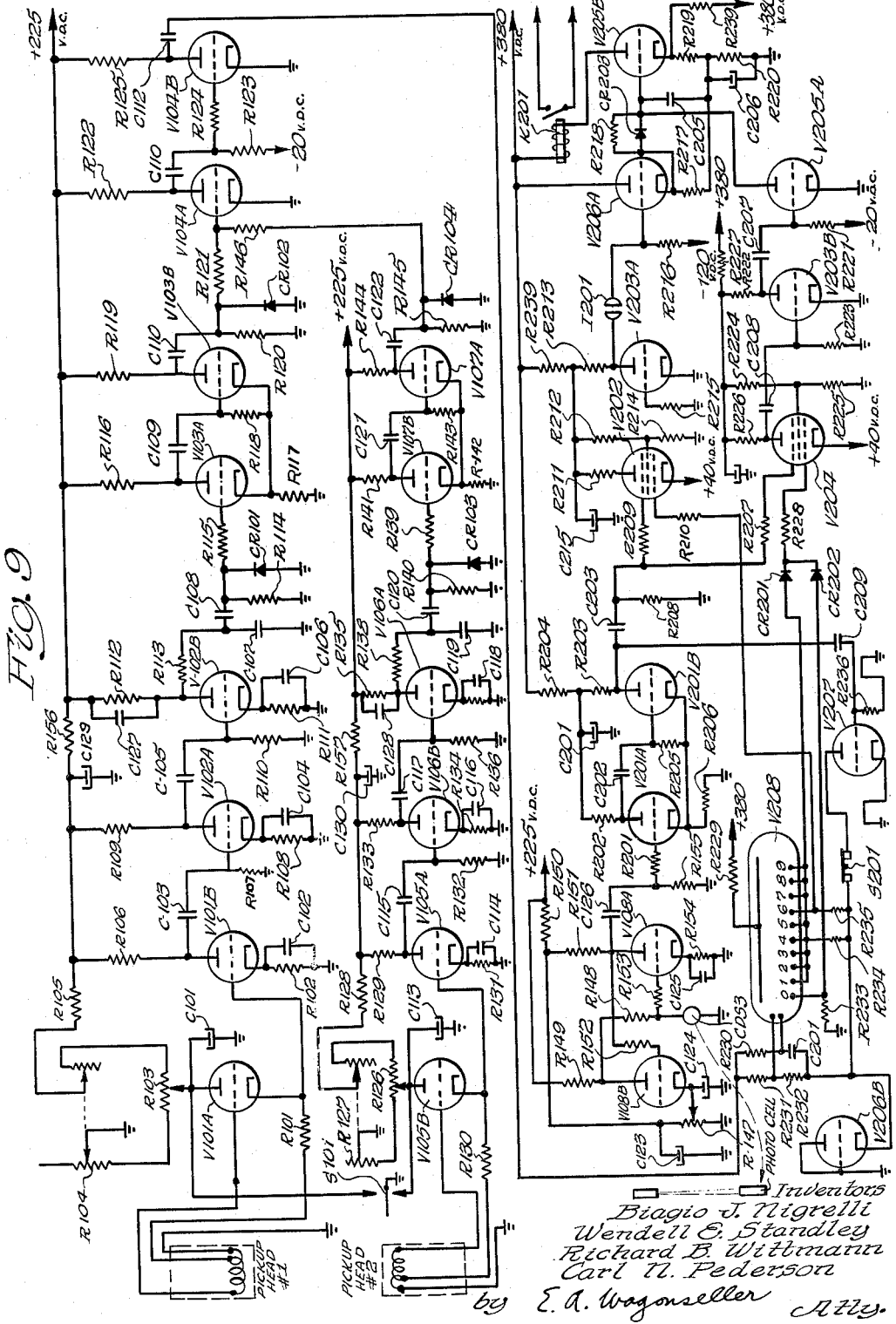
July 4, 1961  B. J. NIGRELLI ET AL  2,990,952
PACKAGE INSPECTION AND SORTING MECHANISM
Filed June 24, 1957  4 Sheets-Sheet 4
Inventors
Biagio J. Nigrelli
Wendell E. Standley
Richard B. Wittmann
Carl N. Pederson
by E. A. Wagonseller Atty.

United States Patent Office 2,990,952
Patented July 4, 1961

2,990,952
PACKAGE INSPECTION AND SORTING
MECHANISM
Biagio J. Nigrelli, 1047 Whitehall Place, Northbrook, Ill.,
and Wendell E. Standley, Lake Forest, Richard B. Wittmann, Chicago, and Carl N. Pederson, Westmont, Ill.,
assignors to Ralph W. Johns, Biagio J. Nigrelli, and
Robert R. Johns, Chicago, Ill., a co-partnership
Filed June 24, 1957, Ser. No. 667,446
8 Claims. (Cl. 209—72)

The present invention relates to package inspecting and sorting mechanism and more particularly to mechanism for segregating incomplete packages or parts of packages from complete packages.

An object of the invention is to provide an inspecting and sorting mechanism designed to receive the output from a can packaging machine for packaging a plurality of cans into cartons and to segregate from the machine output any loose cans as wel las any incompletely filled cartons, whereby only completely filled cartons will be delivered to a subsequent case loading station.

Another object is to provide a mechanism of this type which will accomplish the desired results effectively, continuously and without normally requiring attention from operating personnel.

A further object is to provide an inspection device for determining complete packages of magnetically permeable articles, such as a group of filled tin cans, and combining such inspection device with a magnetic conveying means which is actuated to engage and convey the complete packages along a desired path, but which is so controlled that it will not engage incomplete packages and will allow them to be discarded.

Additional and more specific objects of the invention will become apparent as the description proceeds.

The mechanism as disclosed herein includes a belt conveyor arranged to receive filled packages of cans, such as so called "tin cans" which are magnetically permeable, from a carton loading machine adapted to load open end cartons. As occasionally a defective carton may be passed through the loading machine or some other irregularity may our which will cause a carton to be incompletely filled, it is important to segregate from the conveying line any loose cans and any incomplete packages. As the output of the machine is conveyed away on the belt conveyor the occasional loose can and incomplete package will travel with the complete packages. The cans are removed from the conveying line by leading the packages over a small length of conveyor consisting of one or more narrow belts arranged to carry a package but providing a sufficient space so that loose cans or other foreign articles will not be conveyed, but will fall from the end of the belt conveyor.

The packages, both completely loaded and incompletely loaded, then pass to another conveyor along which suitable inspection, counting and control means are located. If the package passing the inspection and control means is incompletely loaded it is removed from the conveying line and delivered into a suitable receptacle or conveyor designed for the purpose. Packages inspected and determined complete are engaged by a magnetic conveying means and by such means carried past the discard point and continue in the normal conveying line.

In the preferred form of the invention an electromagnet is employed for the magnetic conveyor. Two conveyor sections in the normal conveying line are spaced apart and bridged over by the magnetic conveyor. When packages determined to be complete come to a point near the discharge point of the first conveyor section the electromagnet is energized, causing such package to be gripped from above and carried over the opening between the two spaced conveyors. In the normal operation of the mechanism, after the initial complete package is engaged and carried by the magnetic conveyor, the electromagnetic unit remains energized at least until the next oncoming package is scanned or inspected by the inspecting device. However, when the inspecting device determines a can count other than the correct count, it causes the switch to the electromagnetic unit of the magnetic conveyor to open to deenergize the unit, thus causing the off-count package to be rejected by dropping from the discharge point of the conveyor section adjacent the receiving end of the magnetic conveyor.

In the drawings
FIG. 1 is a somewhat schematic perspective view, with parts omitted and broken away, showing the essential operations of the mechanism;
FIG. 2 is a perspective view of a form of package which the mechanism is designed to handle;
FIGS. 3 and 4 are plan views which taken together illustrate a preferred form of the package conveying and sorting equipment;
FIGS. 5 and 6 are side elevational views of the equipment shown in FIGS. 3 and 4;
FIG. 7 is a partial vertical sectional view taken along lines 7—7 of FIG. 6;
FIG. 8 is a schematic side elevation illustrating certain electrical control wiring; and
FIG. 9 is a wiring diagram of the electrical control unit.

The machine herein illustrated is particularly adapted to receive and handle filled packages of ferrous metal cans, containing beverages or other products, after such packages have been loaded by a machine of the type disclosed in the United States Letters Patent of B. J. Nigrelli et al., No. 2,803,932.

The invention is not limited for use with a particular style of package. The package illustrated comprises a group of six cans contained in an open end, sleeve-type carton, the cans being arranged in the carton in two rows of three each. The mechanism of the present invention is also well suited to handle numerous other forms of packages, such as packages containing quantities other than six cans and packages with closed or partially closed ends. Cartons to be handled on the machine may be constructed either with or without handles.

A suitable base frame 10 is provided having horizontal side sections 11, 11. Supported on the frame is a primary collecting conveyor 12 to receive packages P from a package loading machine, a secondary conveyor 13 for effecting the rejection of loose cans, an intermediate collecting conveyor 14 upon which the packages are turned through 90°, a receiving conveyor 15, and a bridging conveyor 16 arranged to carry packages from the intermediate collecting conveyor to the receiving conveyor. The frame also supports a chute 17 below the conveyor 13 for receiving rejected loose cans, and a chute 18 below the magnetic conveyor for receiving rejected incomplete packages.

The primary collecting conveyor 12 preferably has its receiving end arranged to receive packages by gravity from the package loading machine. The filled packages may be delivered to conveyor 12 by a suitable chute 21 supported on the frame of the loading machine. The conveyor 12 preferably is in the form of an endless belt 22 passing at one end over a driven roller 23 on shaft 24 and at the other end over a roller 25 on shaft 26.

The construction preferably includes a provision to permit tilting of the receiving end of the conveyor 12, and for this purpose the shaft 26, carrying roller 25, is mounted in a tilting frame section, including spaced bars 29, 29 pivotally mounted at their inner ends on a rod 30, received in bearings 31, 31 supported on the base frame side sections 11, 11.

Arms 32, 32 bearing slidable counterweights 33, 33 are keyed on the ends of the rod 30 to counterbalance the tilting portion of conveyor 12. At the receiving end of the conveyor a short upwardly and outwardly sloping chute section 34 is preferably provided to guide filled packages, received from the chute 21, onto the conveyor 12.

Supporting means in the form of rollers 35, 35 are provided intermediate the ends of belt 22 and bearing upwardly against the under surface of the upper run of the belt.

The positions of the counterweights will be such that a predetermined number of filled packages, such as two or three, may be carried on the tiltable section without producing any tilting movement. However, in the event of a stoppage of the conveyors for any reason, with the effect that an excessive number of packages will be deposited on the conveyor 12, its outer end portion will tilt downward, tending to avoid damage to the package loading machine.

The width of the conveyor belt 22 is preferably somewhat less than the length of the individual packages and such packages in the present instance are carried with their long axes transverse to the direction of travel of the conveyor. Guide bars 38 and 39 are preferably provided which are secured to uprights 40, 40 on the frame members 11. These guide bars engage the ends of the packages and keep them in proper position on the conveyor 12.

The secondary conveyor 13 is preferably in the form of two spaced, relatively narrow belts 41, 41 passing at one end over grooves in the ends of the roller 23 and at the other end passing over grooves in the ends of a roller 42 on shaft 43 journalled in bearings supported on the frame members 11, 11. Filled packages, leaving the belt 22 will be conveyed on belts 41, 41 and delivered to the next conveyor section 14, but any loose cans, fragments of paperboard or other foreign articles smaller than the packages will not be carried on the belts 41 and will be discarded and delivered into the chute 17.

The packages, whether or not filled with the proper number of cans, pass from conveyor section 13 to conveyor section 14 where the packages are preferably turned through a 90° angle.

The conveyor 14 as herein disclosed is formed with two belts 45 and 46 which are arranged to travel at differential speeds. Belt 45 at its receiving end passes over roller 42 on shaft 43, and at its discharge end passes over a roller 50 keyed to a driven shaft 51.

Belt 46 is preferably driven at a slower speed than belt 45. To accomplish this result the belt 46 passes over a driven roller 52 mounted to turn freely on the shaft 51 and passes over an idler roller 53 on shaft 43. Roller 52 has secured thereon a sprocket 54 over which a driving sprocket chain 55 passes.

The shaft 51 is driven from a motor 55 through a sprocket 56 on the motor shaft 57 and sprocket chain 58 passing over a sprocket 59 keyed on shaft 51. A jack shaft 60 is journalled on a bracket on the frame 11. This shaft 60 has a sprocket 61 keyed thereon over which passes a sprocket chain 62 driven by a sprocket 63 keyed on shaft 51. At the other end of the jack shaft 60 a sprocket 64 is keyed, around which passes the previously mentioned sprocket chain 55 which drives the roller 52. The sizes of the sprockets are related so that the belt 46 will be driven slower than belt 45 and since one end portion of the package will bear upon belt 46, this end of the package will tend to lag and the package will swing through a 90° angle as it is being conveyed.

For the purpose of augmenting the swinging of the package an obstruction in the form of an upstanding roller 68 is provided. As the package is conveyed it is so guided that an end portion contacts the roller 68 necessitating the swinging of the package around the roller.

An outwardly curved section 38a is formed in the guide bar 38 to facilitate and guide the turning of the package.

Thus, packages received on the collecting conveyor 45 are turned through a 90° angle and are discharged from this conveyor with their long axes extending in the direction of travel. In practice the speed of the conveyor system is such that packages delivered to the primary conveyor by the package loading machine will be spaced apart a distance of about two package widths. After the packages have been turned their spacing will be approximately one and one-half package widths. Exact spacing of the packages on conveyor 45 is not important so far as practice of the invention is concerned. The preferred manner of operation is to provide for minimum spacing on conveyor 45 of about one package length.

An important feature of the present invention is to provide for segregation of incompletely filled packages from the completely filled packages and such segregation is preferably effected through control means associated with the collecting conveyor 14. Each package, as it passes an inspecting station, is inspected to determine its condition as to completeness. If complete, the package continues along a normal conveying line, and, if incomplete, the package passes to a reject conveyor.

Since the invention is particularly applicable to the handling of packages containing cans made of ferrous metal, or so-called tin cans, having magnetic capacity, a magnetic conveyor is preferably employed to segregate the complete packages from the incomplete packages. While the magnetic conveyor could be employed to engage either one or the other, it is preferred to have the magnetic conveyor engage the complete packages traveling on the collecting conveyor and direct the packages along the normal conveying path. The magnetic conveyor is so controlled that incomplete packages are not engaged and pass to a reject path.

As illustrated, the magnetic conveyor, indicated as a whole at 16, comprises side frame section 70, 70 adjustably supported on upright members 71 and 72. A pair of conveyor belts 73, 73 pass over individual pulleys 74, 74 and 75, 75 mounted respectively on shafts 76 and 77. The pulleys 75 are keyed on shaft 77 which has a gear 78 thereon driven by a gear 79 on a jack shaft which also carries a sprocket 80 driven by a sprocket chain 81 passing over a sprocket 82 on the driven shaft 51.

The conveyor 16 is disposed in partial overlying relation to collecting conveyor 14 and is supported so that the under surfaces of the lower runs of belts 73 will be a short distance above the top surfaces of the packages carried on conveyor 14. At its discharge end conveyor 16 overlies the receiving conveyor 15 on which the complete packages continue in what may be termed a normal path toward a station for loading a plurality of filled packages into shipping containers.

While various expedients can be employed to cause the selective operation of the magnetic conveyor so as to engage and carry the desired packages, it is preferred to obtain the desired selectivity by one or more selectively controlled electro magnets. For this purpose a source of electric current is provided with conductors to carry current to the electromagnet and switch means to control the flow of current.

As illustrated, a plurality of electromagnets 85, 86, and 87 may be supported on the frame members 70, 70 with their pole extremities disposed in close relation to the upper surfaces of the lower runs of belts 73, 73. The strength of the magnets is such that they can attract filled tin cans within suitable cartons, such as illustrated in FIG. 2, and hold the packages against the belts 73, 73. These belts, of course, provide a sufficient frictional grip on the package surfaces so that they will be readily conveyed during the time the magnets are operative. While all of the magnets can be selectively operated it is preferred to operate selectively only the first magnet 85 which is immediately above the end portion of conveyor 14. The extent of the individual magnet poles in the direction of travel is preferably the approximate length of a package to be handled. The remaining magnets 86 and 87 may be retained in energized condition, or, if desired, they could be in the form of permanent magnets.

In order to accommodate packages of different heights, threaded rods 88 and 89 may be employed, having their upper portions supported against relative vertical movement with respect to frame members 70 in bearing brackets 90, 91, and having their threaded lower ends engaged in threaded nut members held in upright frame elements 71, 72.

Control means to open and close the switch for electromagnet 85 are preferably located at a convenient place along the conveyor 14 and, while it is within the scope of the invention to operate the control means manually, it is preferred to operate such means by instrumentalities which are responsive to cans contained in the packages carried on conveyor 14. More specifically, instrumentalities are preferably provided which are capable of detecting the presence within a package of the desired number of cans—in other words—the number of cans for which the package is designed. The mechanism herein illustrated is designed to handle packages containing two rows of cans and, for purposes of illustration, the mechanism will be described on the assumption that the packages to be handled are composed of two rows of three cans each, placed in rectangular arrangement.

The control mechanism, prior to the passage of a package, is in "off" position and will remain in "off" position following the passage of a defective package past the control point. The control mechanism is designed to cause energization of the electro magnet of the magnetic conveyor upon the passage of a package with the proper number of cans therein, and the control mechanism also is preferably so designed that the conveyor magnet will remain energized for a brief interval following the passage of a good package. Thus, if the conveyor magnet is energized, the next good package, in passing the control point in normal sequence, will merely cause an extension of the period the controls will keep the magnet energized. This will continue until the passage of a defective package or until the flow of packages past the control point is substantially interrupted. Defective packages rejected by the control mechanism will drop from the end of the belt 45 and will be received by the supplemental conveyor or reject chute 18 for suitable disposition.

The controls may be considered as being in three groups. One group, herein referred to as the can counting mechanism, is capable of sensing and counting cans as they are conveyed. A second group, referred to as the package detecting mechanism, senses or detects the passage of a package past the control point. A third group includes an indicator circuit which correlates signals initiated by the first and second groups and supplies the impulse which actuates the switch K201 controlling the magnet 85 in the electro magnetic conveyor. Under normal conditions the circuits of the third group function to close the switch K201 to the electro magnet at the start of the operation after receiving signals from the first and second groups that a package containing the proper number of cans has passed the control point. After the operation has started the signals received by the third group serve to maintain the switch closed so long as proper count packages are passing but cause opening of the magnet switch if an off-count package should pass the control point.

The sensing parts of the counting mechanism preferably comprise two pick-up heads, one being arranged at each side of the path of packages on conveyor 14. These pick-up heads are indicated at 93 and 94. See FIGS. 1, 4, 8 and 9. The packages travel on conveyor 14 so that each of the double rows of three cans normally contained therein will travel within the operative range of one of the pick-up heads. Thus each pick-up head is designed to count the cans which pass adjacent to it.

The sensing part of the package detecting mechanism preferably comprises a suitable photoelectric cell 95 secured on one side of the conveyor and a light source 96 on the other side. The signal impulse is initiated by the reestablishment of the light beam after the packages pass the photoelectric unit.

The circuits of the third group of the control mechanism are connected with the circuits of the first and second groups mentioned above to receive signals or impulses from such first and second groups, one signal being the can count and the other being the completion of a count which is indicated by the passage of a package. As pointed out above, in the initial operation of the machine after a period of inactivity, the mechanism of the third group, upon receiving a six-can count signal and the signal that a package has passed the light beam, will cause closing of the switch to energize the electromagnet, whereby the accurately filled package will be carried over to the receiving conveyor. The relay K201 remains closed for a desired interval which preferably is at least sufficient for a second accurate count package to clear the control point. In practice, the circuit controlling the relay is designed to hold the relay closed for a minute or more, giving time to stop the machine for a short period for mechanical inspection or adjustments without allowing a good package, temporarily held stationary on the magnetic conveyor, from falling off.

Following the initial operation of the machine the circuits of the third group of the control mechanism function to re-extend the interval during which the electromagnet will be held in operative condition so long as accurate count packages are passing the control point. However, when an off-count package passes the control point the signal transmitted by such off-count to the third group of the control mechanism will cause instant opening of the electromagnet switch to reject the off-count package.

While the pick-up heads may take various specific forms it is preferred to employ pick-up heads that operate in such a manner as to produce an output which can readily be converted to a single pulse when a magnetically permeable object, such as a tin can, passes through, a restricted magnetic field.

As best shown in FIGS. 1 and 4, one of the pick-up heads, herein shown as head 93, is mounted somewhat forward of the other pick-up head 94. The distance of offset is preferably approximately equal to one can radius to avoid interference in the signals conveyed by the pick-up heads. As each can in a package passes directly opposite its adjacent pick-up head, the counter hereinafter described receives one pulse, and as one head is advanced with respect to the other, the pulses are prevented from occurring simultaneously.

Circuits for operating the detector units for individual cans within the packages, for registering the passage of packages and for the indicating unit are shown in FIG. 9. A suitable power supply circuit, not shown, will be employed to furnish power of the desired values.

The various switches, relay armatures and relay contacts are shown in their rest position. The control wiring is arranged in three principal groupings comprising: (1) the circuit for the can detectors or pick-up heads, (2) the circuit for the photo cell or package sensing unit and (3) the counting and indicating circuits.

As pulses are produced by movement of the packaged cans in the first package conveyed past the pick-up heads, the count is registered on a neon glow counter tube. As soon as the last can of the two rows of cans has been counted and the package clears the beam of the photocell unit, the indication of such fact is transmitted to the counting and indicating circuit. The can count is electronically checked on the neon glow tube to determine if it is a correct count—that is—a count of six. If the count is six, a relay is closed and will remain closed for an interval. If the count is other than six, the relay will not close. If the relay has previously been closed due to the passage of a package with correct can count past the pick-up heads, the relay is caused immediately to open upon the passage of an off-count package past the photocell.

The pick-up heads comprise RF coils which operate as oscillators in conjunction with triode tube sections V101A and V105B respectively. The plate voltage to these two sections is controlled by individual sensitivity potentiometers R103 and R126 and dual range potentiometers R104 and R127 located in proximity to these sensitivity controls. This plate voltage is set or adjusted so that when no magnetically permeable metal is close to the pick-up head, the oscillator will oscillate in a stable manner. The preferred frequency for the oscillator is approximately 400 kc. per second.

When a can passes in close proximity to the pick-up head, the resultant lowering of the Q or electrical efficiency of the oscillating circuit will cause the oscillator to drop out of normal oscillation. This effect, according to preferred practice, will occur when the center line of the packaged can (taken transversely to its line of travel) comes within approximately one-half inch of the pick-up head center line. After the center line of the can passes beyond the pick-up head approximately one-half inch normal oscillation is resumed. This effect is continued as successive cans pass the pick-up head. The interruption of the oscillation is the input signal for the counter. Each pick-up head and oscillator tube is coupled through an isolation amplifier V101B and V105A respectively into untuned amplifiers V102A and V106B. The RF output from the amplifiers is fed into the grids of biased or linear plate detector tubes V102B and V106A. These tubes, in the preferred practice, are cathode biased into projected cut-off by 10,000 ohm resistors in their cathode circuits. The resultant bursts of rectified RF appearing across the 1000 ohm plate resistors is filtered by capacitors C127 and C128 to give a D.C. voltage change at the plates of V102B and V106A. This change in D.C. from the detector tubes is coupled into a pair of one shot multivibrators V103 and V107. The constants of these multivibrators are preferably so adjusted as to produce a positive going square wave output of approximately 10 milliseconds duration for each can sensed by the pick-up head. The square wave output of each multivibrator is fed into a differentiator circuit which also includes a diode clamp. This clamp element short circuits the positive going pulse but leaves the negative going pulse unaffected. Since each pick-up head is affected only by the cans on its side of the package, the multivibrator associated with its circuit will produce one negative pulse for each can on its side of the package.

As mentioned previously, in order to prevent the pulses created by cans passing the head on one side of the package from occurring at the same time as those created by the cans on the other side, the heads are located approximately one can radius apart in the line of travel of the package. It is, therefore, possible to combine the outputs of the two differentiator circuits, and the output of the two will interleave. This combined output is fed into a two-stage amplifier and pulse shaper V104A and V104B. The output of V104B is a negative going sharp spike of voltage for each can in the package.

There is preferably employed in the photocell system a cadmium sulfide photocell unit CDS3. The photocell unit employed is preferably one having a relatively slow operation and it is suitably connected in a regenerative, transient response, speed-up circuit V108A and V108B. The output derived from the plate V108A is a positive going pulse when the light beam is re-established after being interrupted by the passage of a package. A potentiometer R147 is preferably employed in the speed-up circuit and is adjusted to give maximum amplitude of this positive pulse.

The indicator unit is constructed to receive two channels of information, one being from the pick-up heads and one from the photocell circuit. The indicator unit first receives a series of negative pulses from the effects of the cans passing the pick-up heads. It next receives a positive pulse created in the photocell circuit when the package has cleared the photocell light beam. This positive pulse is fed into a one shot multivibrator V201A and V201B. This circuit, like the multivibrator in the detector or pick-up head unit, produces one positive going square wave for each positive pulse applied to it. In practice the time duration of this square wave output is approximately 30 milliseconds long. This square wave is fed into the secondary grids of two gate tubes V202 and V204. The pulse thus produced will appear as a negative square wave at the gate tube plate provided either one of the gates is unlocked by a plus voltage on a primary grid of the gate. This unlocking voltage is derived from a counter tube V208, which preferably is a glow discharge tube.

The counter tube receives the negative pulses from the detector unit. These pulses cause the glow discharge in the tube to index from the zero position cathode, one cathode position clockwise for each pulse received. For the case when an acceptable six can package passes the pick-up heads, the six negative pulses fed into the counter tube V208 will cause the glow discharge to index to cathode number 6. Resistor R234 connected to cathode 6, will then develop a voltage due to its cathode current. This voltage is applied to the primary grid of the pass gate tube V202, thus unlocking the pass gate and allowing the signal described below to pass.

The 30 milliseconds actuating pulse from the multivibrator will cause a like negative pulse to appear at the plate of the pass gate tube only. This pulse is then inverted in V203A and fed into D.C. cathode follower V206A through voltage subtractor neon tube I201. This tube is continuously fired and is conducting a very small current, however, during the duration of the 30 millisecond pulse this neon tube will glow with brighter intensity. The cathode follower V206A feeds a capacitor C205 through a diode CR203. The diode allows the capacitor to accept a positive charge rapidly. The discharge path of the capacitor is restricted and controlled by a shunt resistor R218 across the diode. The voltage across capacitor C205 is used to control the relay keyer V205B. As long as a positive charge exists on capacitor C205, the relay K201 acting as a time delay mechanism will be actuated and remain in holding position and will retain the electromagnet 85 energized.

To retrace the operation beginning with the counter tube V208, let it be assumed that an unacceptable or off-count package of either less or more than six cans passes the pick-up heads. The counter tube glow will index from the zero cathode position to a stopping point determined by the number of cans counted. With the equipment herein disclosed this can be any position from zero to nine, except six. The voltage output from these cathodes is developed across resistor R233 in the case of a zero count and R234 for all other than a six count. These two resistors are coupled together through isolating diodes CR201 and CR202 to the primary grid of the reject gate tube V204. A positive voltage appearing on this grid will unlock the stage and an interrogating 30 milliseconds square wave from the multivibrator will cause a like negative square wave to appear in the plate circuit of the reject gate tube. This pulse is inverted in V203B and fed into the grid triode section V205A. This tube is connected across the relay keyer capacitor C205. Conduction of V205A due to this 30 millisecond square wave from the reject gate tube will cause capacitor C205 to dump any previous positive charge, thus immediately cutting off the relay keyer tube V205B. The relay K201 will then release and its contacts will open, thereby cutting off the flow of current through the electro magnet 85.

The 30 milliseconds positive square wave output of the photocell multivibrator V201 has a third function. The square wave is differentiated through capacitor C209 and resistor R236 and the trailing edge negative pulse is used to cut off the counter tube re-set tube V207. By cutting off V207, all cathode current caused by a glow discharge in the counter tube V208, other than a glow discharge at the zero position is disrupted. This forces the glow discharge to re-establish between the zero position cathode and the anode. A push button switch S201, normally closed, is a manual device for accomplishing the same result. The unit V206B is connected as a diode and is used to prevent the negative indexing pulses, which operate the counter tube, from appearing on the counter cathodes through the common impedance of unit V207.

A suitable power circuit, not shown, is provided to supply voltage of the desired values to the control circuit. This power circuit comprises a conventional form of power transformer, including a primary winding connected with a 117 volt A.C. line to supply suitable values of voltage to various lines in the control circuit. The required negative bias voltage is provided by using a low capacity filament transformer of a rating of 6.3 volts A.C. connected to the 6.3 volt A.C. winding of the power transformer. The A.C. voltage derived from the primary winding of the transformer is half wave rectified and filtered to yield a negative 115 volts D.C. This provides the necessary isolation of the bias supply with respect to variation in main power loads.

Where voltage values are shown in FIG. 4, namely, +225, +380, −120, −20, +40, etc., the power supply circuit will supply these values at the required current.

In the initial stage of operation of the machine, assuming inaccurately filled packages are moving along the collecting conveyor, the magnetic conveyor will remain inoperative and the inaccurately filled packages will be directed from the end of the conveyor 14 down the discard chute 18. As soon as an accurately filled package passes the counting mechanism the magnets in the electromagnetic conveyor will be energized and the accurately filled, or good-count, package will be diverted by the magnetic conveyor so that it will be delivered onto the receiving conveyor. The magnetic conveyor may thus be termed a diverting device as it diverts good-count packages from movement down the discard chute.

From the foregoing, it is apparent that the present invention provides convenient and effective mechanism for segregating from a package conveying line inaccurately filled packages of cans, as well as loose cans and other foreign objects smaller than a complete package, as herein illustrated. Due to the use of the sensing and counting unit all off-count or inaccurately filled packages will be rejected and it is unnecessary to employ an operator to inspect the packages. The present mechanism is particularly advantageous for use in packaging lines in which completed packages are to be grouped and loaded into shipping containers solely by mechanical means as it is, of course, important that no off-count can packages be included when the packages are assembled into shipping containers.

While the foregoing description sets forth a preferred embodiment of the invention it is apparent that numerous changes may be made in the mechanism described as well as in the control unit without departing from the spirit of the invention, and it is desired that the present embodiment be considered in all respects as illustrative rather than restrictive, reference being had to the appended claims rather than to the foregoing description to indicate the scope of the invention.

What is claimed is:

1. A conveyor system for use with a packaging machine of the type which loads a predetermined number of filled, ferrous metal cans within individual cartons, comprising, in combination, a first conveyor arranged to receive the discharge from a packaging machine, including properly filled packages, incompletely filled packages and occasional loose cans, a second conveyor arranged to receive packages discharged from the first conveyor and formed of two spaced conveying members, the spacing of which is sufficiently narrow to support and carry packages, but sufficiently wide to fail to support loose cans and allow such loose cans to fall from the discharge point of the first conveyor, a third conveyor arranged to receive packages from the second conveyor, a fourth conveyor spaced from the third conveyor, a bridging conveyor formed with a conveying member and an electro-magnet above such member, such bridging conveyor being disposed a distance above the third conveyor somewhat greater than the effective height of the packages and in overlapping relation to the discharge point of the third conveyor and the receiving point of the fourth conveyor, a source of electric current, a conducting circuit, a switch means for energizing the magnet, control means disposed along the path of packages carried on the third conveyor for counting the cans contained in the individual packages and arranged to close the switch to energize the magnet providing a predetermined number of cans is contained in the package and to cause such filled package to be carried over by the bridging conveyor to the fourth conveyor, the space between the discharge end of the third conveyor and the receiving end of the fourth conveyor being greater than the dimension of the package being conveyed, whereby incompletely filled packages, failing to actuate the control means, will fall from the discharge end of the third conveyor.

2. A conveyor system for use with a packaging machine of the type which loads a predetermined number of filled, ferrous metal cans into individual cartons, comprising in combination a collecting conveyor upon which both acurately filled and off-count packages are collected in a single line, mechanism for segregating accurately filled packages from off-count packages, such mechanism comprising a receiving conveyor for the accurately filled packages disposed in spaced relation to the collecting conveyor, an electro magnetic conveyor bridging over the space between the first two conveyors, said electro magnetic conveyor being disposed at a height above the collecing conveyor somewhat greater than the package height whereby packages on the collecting conveyor may move freely into position beneath the magnetic conveyor, a source of electric current, a conducting circuit, a switch means for energizing the electro magnet, inspection and counting means disposed along the package path on the collecting conveyor for counting cans contained in the individual packages, and means actuated by the counting means for effecting closure of the switch means upon passage of a package containing a predetermined number of cans, thereby energizing the electro magnet and causing the filled package to be carried over on the magnetic conveyor to the receiving conveyor, the space between the discharge point of the collecting conveyor and the receiving point of the receiving conveyor being greater than the dimension of the individual packages being conveyed, whereby an off-count package will fail to effect closure of the switch controlling energization of the electromagnetic conveyor and such off-count package will fall from the discharge point of the collecting conveyor.

3. A conveyor system as defined in claim 2, including a time delay relay in circuit with the switch means for the electromagnet adapted to remain closed for an interval to allow passage of at least two packages on the bridging conveyor, and means responsive to a can count other than the predetermined number for causing opening of such switch means and deenergizing the electro magnet in the bridging conveyor.

4. A conveyor system for use with a packaging machine of the type adapted to pack a predetermined number of filled, ferrous metal cans into each of a series of cartons, comprising in combination, a collecting conveyor upon which both accurately filled and off-count packages are collected in a single line, mechanism for segregating accurately filled from off-count packages, such mechanism comprising a receiving conveyor for the accurately filled packages disposed in endwise spaced relation from the collecting conveyor a distance greater than the package dimension, a magnetic conveyor arranged to bridge the space between the first mentioned conveyors and carry packages to the receiving conveyor, control means selectively rendering the magnetic conveyor operative and inoperative, means disposed along the package path of the collecting conveyor for inspecting a package to determine whether or not the predetermined number of cans is contained in each package, and means responsive to such accurate count for actuating the magnetic control means to render it operative, whereby an accurately filled package will be carried from the collecting conveyor and delivered to the receiving conveyor.

5. A conveyor system as defined in claim 4, including means for holding the magnetic conveyor in its operative condition for an interval after each accurately filled package has been engaged by the magnetic conveyor, and means responsive to a count other than the predetermined number of cans in a package for rendering the magnetic conveyor inoperative and causing such inaccurately filled package to be rejected.

6. A conveyor system for use with a packaging machine of the type adapted to load a predetermined number of filled, ferrous metal cans into individual cartons, comprising in combination a collecting conveyor upon which both properly filled and off-count packages are collected in a single line, mechanism for segregating accurately filled packages from off-count packages, such mechanism comprising a receiving conveyor for accurately filled packages disposed in spaced relation to the collecting conveyor, an electromagnetic conveyor bridging over the space between the collecting and receiving conveyors and disposed at a height above the receiving conveyor somewhat greater than the package height, whereby packages on the receiving conveyor may move freely into position beneath the magnetic conveyor, a source of electric current, a conducting circuit, switch means for energizing the electromagnet, inspection and control means disposed along the package path on the collecting conveyor for counting cans contained in the individual packages, and means actuated by the inspection and counting means effecting closure of the switch means upon passage of a package containing a predetermined can count, means for maintaining the switch means in closed position for a limited interval permitting passage of a plurality of packages, means acting after each subsequent accurate count package for extending the time of maintenance of the switch means in closed position for additional limited intervals, and means responsive to passage of an off-count package for opening the switch means and causing rejection of such package.

7. A conveyor system for can packages intended to hold a predetermined, uniform number of ferrous metal cans, comprising in combination, a collecting conveyor upon which both accurately filled and inaccurately filled packages are collected to travel in a single line, a receiving conveyor for accurately filled packages spaced from the collecting conveyor a distance greater than the package dimension, a selectively operative magnetic conveyor arranged to bridge the space between the first mentioned conveyors and carry packages to the receiving conveyor, counting means disposed in operative relation to the collecting conveyor adapted to count individual cans in each separate package as the packages are carried on the collecting conveyor, means responsive to a count of a predetermined number for rendering the magnetic conveyor operative, such means being adapted to remain inoperative when the counting means registers a can count other than such predetermined number, whereby inaccurately filled packages are discharged from the collecting conveyor and are not carried by the magnetic conveyor.

8. A conveyor system for use with a packaging machine of the type adapted to load a paperboard container with a predetermined number of filled ferrous metal cans placed side-by-side in the packages in two rows, said system comprising in combination a collecting conveyor upon which both accurately filled and off-count packages are collected in a single line to travel in a direction longitudinally of the rows in the package, means at the discharge end of the conveyor for separating accurately filled from off-count packages, including a diverting device, means for actuating the diverting device, control means for said actuating means to render said means operative and inoperative, said control means comprising counting means which includes two electro-magnetic pick-up heads providing individual magnetic fields, one pick-up head disposed at each side of the collecting conveyor in proximity to the package path, and means for collecting pulses produced by disturbance of the magnetic fields of the individual pick-up heads as the cans in the packages successively pass in proximity to such pick-up heads, the control means for the diverting device actuating means being rendered operative by the means for collecting pulses after a predetermined number of pulses has been collected.

References Cited in the file of this patent

UNITED STATES PATENTS

| 534,783 | Cerruti | Feb. 26, 1895 |
| 586,866 | Potter | July 20, 1897 |
| 1,192,832 | Sherman | July 25, 1916 |
| 1,337,257 | O'Quinn | Apr. 20, 1920 |
| 1,659,973 | Goodner | Feb. 21, 1928 |
| 1,712,700 | Hardenbergh | May 14, 1929 |
| 2,039,688 | Fitzgerald | May 5, 1936 |
| 2,085,671 | Powers | June 29, 1937 |
| 2,303,526 | Cummings et al. | Dec. 1, 1942 |
| 2,415,174 | Hurley | Feb. 4, 1947 |
| 2,681,517 | Schmidt | June 22, 1954 |
| 2,712,408 | Weber | July 5, 1955 |
| 2,732,067 | Cunningham et al. | Jan. 24, 1956 |

FOREIGN PATENTS

| 175,108 | Great Britain | Feb. 16, 1922 |
| 1,125,239 | France | July 9, 1956 |